United States Patent
Yu et al.

(10) Patent No.: US 10,838,895 B2
(45) Date of Patent: Nov. 17, 2020

(54) PROCESSING METHOD OF DATA REDUNDANCY AND COMPUTER SYSTEM THEREOF

(71) Applicant: Wiwynn Corporation, New Taipei (TW)

(72) Inventors: Pei-Ling Yu, New Taipei (TW); Chia-Liang Hsu, New Taipei (TW); Bing-Kun Syu, New Taipei (TW)

(73) Assignee: Wiwynn Corporation, New Taipei (TW)

(*) Notice: Subject to any disclaimer, the term of this patent is extended or adjusted under 35 U.S.C. 154(b) by 283 days.

(21) Appl. No.: 15/951,117

(22) Filed: Apr. 11, 2018

(65) Prior Publication Data

US 2019/0155772 A1    May 23, 2019

(30) Foreign Application Priority Data

Nov. 22, 2017    (TW) .............................. 106140456 A

(51) Int. Cl.
*G06F 13/28*    (2006.01)
*G06F 3/06*    (2006.01)
(Continued)

(52) U.S. Cl.
CPC .............. *G06F 13/28* (2013.01); *G06F 3/061* (2013.01); *G06F 3/067* (2013.01); *G06F 3/0652* (2013.01); *G06F 3/0659* (2013.01); *G06F 3/0664* (2013.01); *G06F 9/00* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

2015/0262633 A1*    9/2015   Lee ...................... G11C 7/1075
                                                                          710/308
2018/0189225 A1*    7/2018   Ramaswamy ...... G06F 13/4282
(Continued)

FOREIGN PATENT DOCUMENTS

CN    106126448 A    11/2016
TW    201432702 A    8/2014
(Continued)

*Primary Examiner* — Pierre Miche Bataille
*Assistant Examiner* — Ryan Dare
(74) *Attorney, Agent, or Firm* — Winston Hsu

(57) ABSTRACT

A processing method of data redundancy is utilized for a Non-Volatile Memory express (NVMe) to transfer data via a fabric channel from a host terminal to a Remote-direct-memory-access-enable Network Interface Controller (RNIC) and a Just a Bunch of Flash (JBOF). The processing method comprises virtualizing a Field Programmable Gate Array (FPGA) of the RNIC into a Dynamic Random Access Memory (DRAM) and storing the data to the DRAM; replicating or splitting the data into a plurality of data packets and reporting a plurality of virtual memory addresses corresponding to the plurality of data packets to the RNIC by the FPGA; and reading and transmitting the plurality of data packets to a plurality of corresponding NVMe controllers according to the plurality of virtual memory addresses; wherein the FPGA reports to the RNIC that a memory size of the FPGA is larger than that of the DRAM.

12 Claims, 6 Drawing Sheets

(51) Int. Cl.
  *G06F 13/42*    (2006.01)
  *G06F 9/00*     (2006.01)

(56) References Cited

U.S. PATENT DOCUMENTS

| | | | |
|---|---|---|---|
| 2018/0321876 A1* | 11/2018 | Ballapuram | G06F 3/0679 |
| 2018/0335954 A1* | 11/2018 | Ramaswamy | G06F 3/0611 |
| 2019/0079895 A1* | 3/2019 | Kim | G06F 13/4278 |
| 2019/0146821 A1* | 5/2019 | Berner | G06F 16/2465 |
| | | | 718/1 |

FOREIGN PATENT DOCUMENTS

| | | |
|---|---|---|
| TW | 201513125 A | 4/2015 |
| WO | 2017/131751 A1 | 8/2017 |

* cited by examiner

PROCESSING METHOD OF DATA REDUNDANCY AND COMPUTER SYSTEM THEREOF

BACKGROUND OF THE INVENTION

1. Field of the Invention

The present invention relates to a processing method of data redundancy and a computer system thereof, and more particularly, to a processing method and a computer system capable of transferring data via a fabric channel for a Non-Volatile Memory express (NVMe).

2. Description of the Prior Art

With the advancement and development of technology, calculation, storage and internet have become a core of fundamental structure in the field of modern information technology. Compared to a conventional internet transmission, Remote Direct Memory Access (RDMA) directly transmits data between applications at two terminals on the internet without involvement of resources of operation system (OS) and central processing unit (CPU), so as to achieve a communication method of high throughput and low latency on the internet. In addition, flash memory and solid state disk (SSD) of new generation phase change memory (PCM) are widely used in information processing systems. However, Just a Bunch of Flash (JBOF) implemented by the conventional information processing system allocates one or more SSDs to single or multiple computing servers. When demands of high availability (HA) or data replication are arisen, relative hardware devices are absent to perform execution.

Therefore, how to make good use of storage resources and solve the problems of processing data redundancy has become an important topic in the field.

SUMMARY OF THE INVENTION

Therefore, the present invention provides a processing method of data redundancy of NVMe over Fabric and a computer system thereof, so as to provide advantages of high efficiency and low latency and elaborate the effect of the storage resources.

An embodiment of the present invention discloses a processing method of data redundancy, utilized for a Non-Volatile Memory express (NVMe) to transfer data via a fabric channel from a host terminal to a Remote-direct-memory-access-enable Network Interface Controller (RNIC) and a Just a Bunch of Flash (JBOF), the processing method comprising virtualizing a Field Programmable Gate Array (FPGA) of the RNIC into a Dynamic Random Access Memory (DRAM) and storing the data to the DRAM; replicating or splitting the data into a plurality of data packets and reporting a plurality of virtual memory addresses corresponding to the plurality of data packets to the RNIC by the FPGA; and reading and transmitting the plurality of data packets to a plurality of corresponding NVMe controllers according to the plurality of virtual memory addresses; wherein the FPGA reports to the RNIC that a memory size of the FPGA is larger than that of the DRAM.

An embodiment of the present invention discloses a computer system, comprising a host terminal, utilized for a Non-Volatile Memory express (NVMe) to transfer data via a fabric channel; a Remote-direct-memory-access-enable Network Interface Controller (RNIC), for receiving the data transmitted from the host terminal, virtualizing a Field Programmable Gate Array (FPGA) of the RNIC into a Dynamic Random Access Memory (DRAM) and storing the data to the DRAM, replicating or splitting the data into a plurality of data packets, and reporting a plurality of virtual memory addresses corresponding to the plurality of data packets to the RNIC by the FPGA; and a Just a Bunch of Flash (JBOF), for reading and transmitting the plurality of data packets to a plurality of corresponding NVMe controllers according to the plurality of virtual memory addresses.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
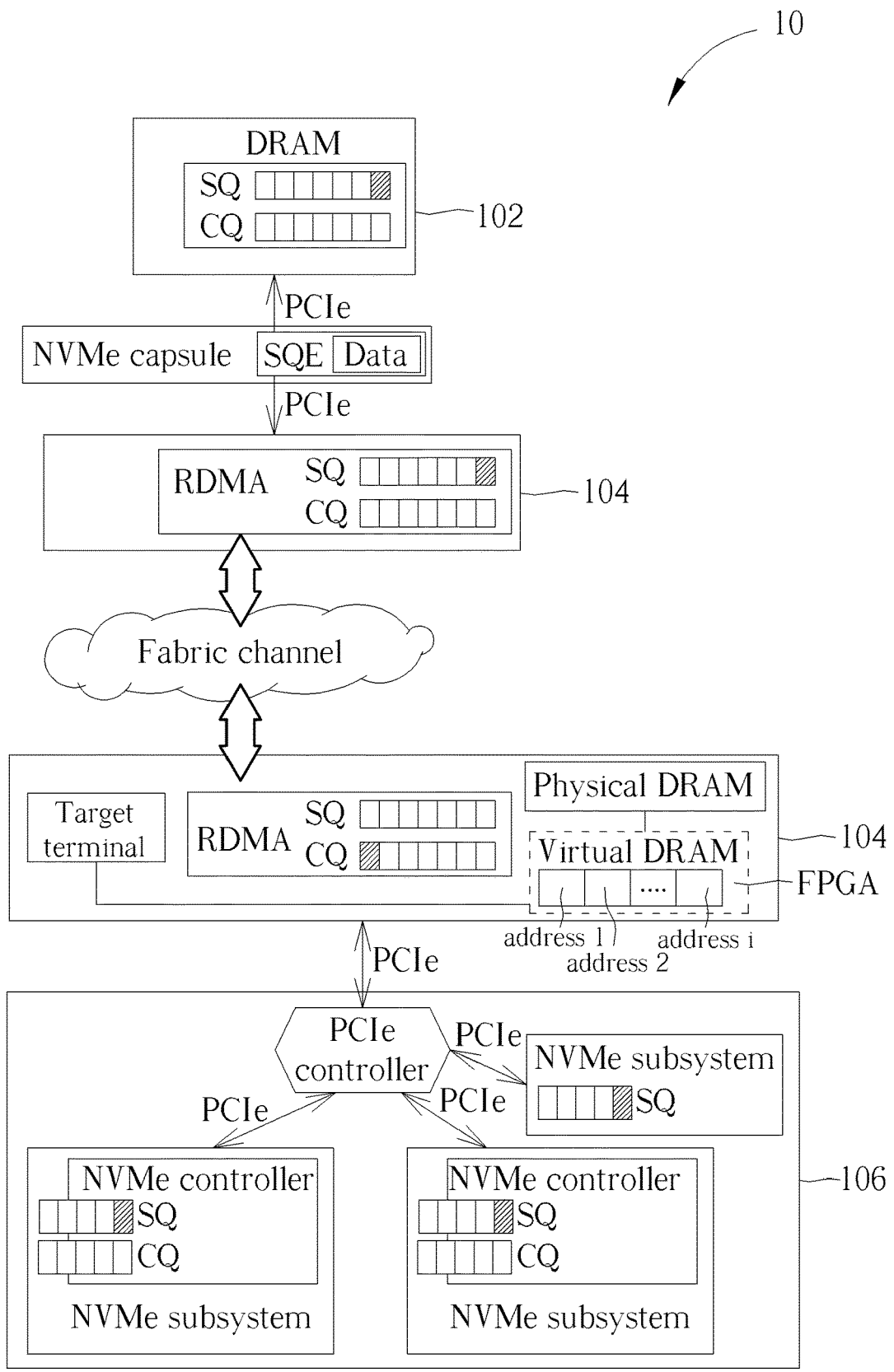
FIG. 1 is a schematic diagram of a computer system according to an embodiment of the present invention.

Please refer to FIG. 1, which is a schematic diagram of a computer system 10 according to an embodiment of the present invention. The computer system 10 is utilized for processing data redundancy of a data processing system, and includes a host terminal 102, a Remote-direct-memory-access-enable Network Interface Controller (RNIC) 104, a fabric channel, and a Just a Bunch of Flash (JBOF) 106. The host terminal 102 sends data to the JBOF 106 via the fabric channel and the RNIC 104. The RNIC 104 is utilized for receiving or transmitting the data sent from the host terminal 102, and virtualizing a Field Programmable Gate Array (FPGA) as a dynamic random access memory (DRAM). As shown in FIG. 1, the RNIC 104 of the host terminal 102 is utilized for transmitting the data, sent from the host terminal 102, to a receiver of the RNIC 104. The receiver of the RNIC 104 is utilized for virtualizing the FPGA as a virtual DRAM, and the FPGA reports that a size of a virtual memory of the RNIC 104 is larger than that of the DRAM. In addition, the RNIC 104 replicates or splits the data into a plurality of data packets, and the FPGA reports a plurality of virtual memory addresses address_i corresponding to the data packets to the RNIC 104 equipped with a System on Chip (SoC). The JBOF 106 is utilized for reading the corresponding data packets based on the virtual memory address address_i, and transmitting the data packets to a plurality of corresponding NVMe controllers. As such, the computer system 10 may transmit a large amount of data to process the data redundancy over the fabric channel without involvement of a central processing unit (CPU) and an operating system (OS).

The embodiment stated above briefly illustrates the processing method of data redundancy in the computer system 10 of the present invention, which is utilized for the NVMe to fast and effectively transmit data via a fabric channel from the host terminal to the receiver. Notably, those skilled in the art may make proper modifications accordingly, which is not limited thereto. For example, according to different demands of manufacturers or computer systems, different RNIC may be selected, for example, Broadcom BCM5880X SOC, or different JBOF maybe selected, such as NVMe storage device, Wiwynn ST300. The above embodiments may be modified based on settings of the computer system, instructions of manufacturer or user, but not limited thereto, and all belong to the scope of the present invention.

Figure 2:
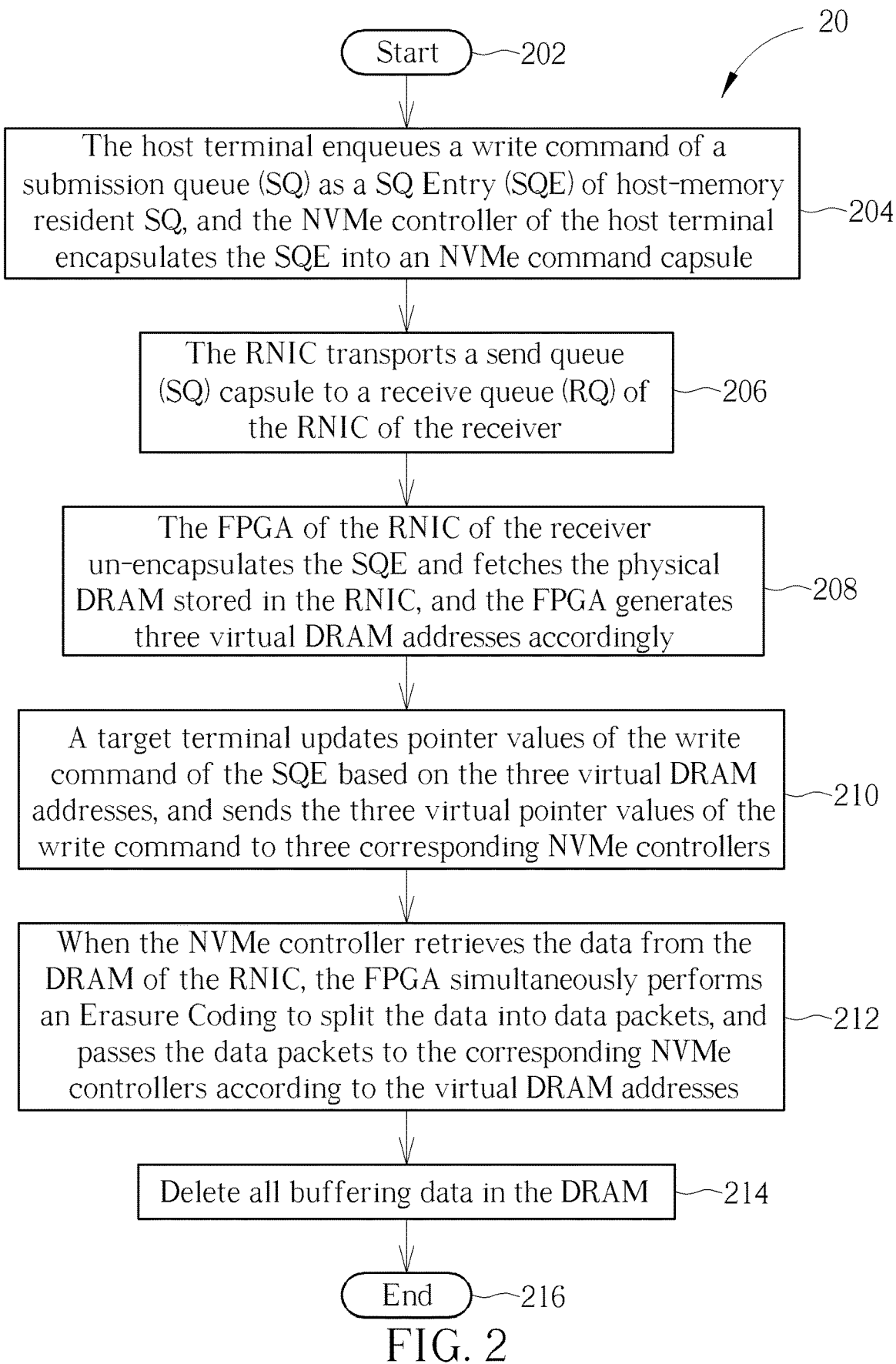
FIG. 2 is a schematic diagram of a processing process of data redundancy according to an embodiment of the present invention.

In detail, please refer to FIG. 2, which is a schematic diagram of a processing process 20 of data redundancy according to an embodiment of the present invention. Please refer to both FIG. 1 and FIG. 2. Take a write command as an example, under a structure of NVMe over Fabric and RDMA, the host terminal 102, such as Leopard, transmits the data to the JBOF 106 (Wiwynn ST300) via the RNIC 104 equipped with the SoC (e.g. Broadcom BCM5880X), under such a condition, the processing process 20 of the data redundancy includes the following steps:

Step 202: Start.

Step 204: The host terminal 102 enqueues a write command of a submission queue (SQ) as a SQ Entry (SQE) of host-memory resident SQ, and the NVMe controller of the host terminal 102 encapsulates the SQE into an NVMe command capsule.

Step 206: The RNIC 104 transports a send queue (SQ) capsule to a receive queue (RQ) of the RNIC 104 of the receiver.

Step 208: The FPGA of the RNIC 104 of the receiver un-encapsulates the SQE and fetches the physical DRAM stored in the RNIC 104, and the FPGA generates three virtual DRAM addresses accordingly.

Step 210: A target terminal updates pointer values of the write command of the SQE based on the three virtual DRAM addresses, and sends the three virtual pointer values of the write command to three corresponding NVMe controllers.

Step 212: When the NVMe controller retrieves the data from the DRAM of the RNIC 104, the FPGA simultaneously performs an Erasure Coding to split the data into data packets, and passes the data packets to the corresponding NVMe controllers according to the virtual DRAM addresses.

Step 214: Delete all buffering data in the DRAM.

Step 216: End.

Therefore, according to the processing process 20, the NVMe controller of the computer system 10 (i.e. the host terminal 102) directly performs point-to-point transmission between two terminals of the RNIC 104 and the JBOF 106 over the fabric channel. Notably, in this example, the RNIC of the target terminal replicates or splits the data into three data packets, which is not limited thereto. The host terminal 102 and its RNIC 104 perform transmission via a Peripheral Component Interconnect Express (PCIe). Besides, the JBOF 106 and its RNIC 104 (i.e. the target terminal) also perform transmission via the PCIe, such that the computer system 10 does not need to waste much resource on processing and moving the data under environment of high speed internet.

Figure 3:
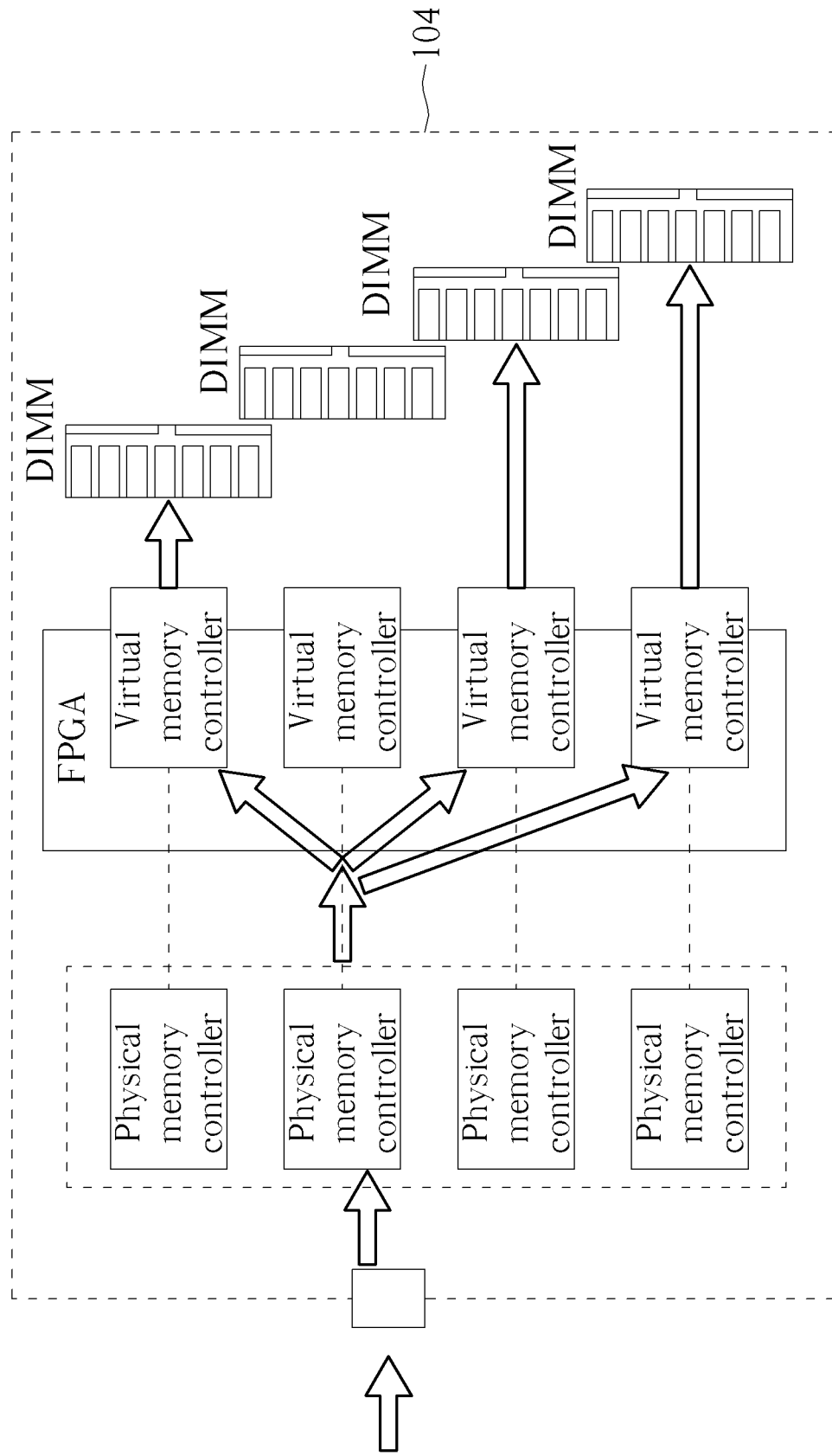
FIGS. 3-5 are schematic diagrams of an implementation of FPGA according to an embodiment of the present invention.

Since the FPGA is a programmable hardware, the FPGA of the RNIC 104 may be implemented in different ways. In details, please refer to FIG. 3, which is a schematic diagram of an implementation of FPGA according to an embodiment of the present invention. In an embodiment, as shown on FIG. 3, the data are transmitted from the host terminal 102 (not depicted in FIG. 3) to the RNIC 104 of the JBOF 106 via the NVMe over Fabric. Meanwhile, the RNIC 104 selects one of a plurality of physical memory controllers to process and store the data, and then, a plurality of virtual memory controllers corresponding to the physical memory controllers, which are virtualized by the FPGA, replicate or split the data into the data packets. The data packets are stored into the corresponding DRAM by a plurality of corresponding virtual memory controllers, and the target terminal of the RNIC 104 provides the virtual memory addresses corresponding to the physical memory addresses to a plurality of NVMe subsystems. Notably, each of the physical memory controllers may correspond to a virtual memory controller and one of a plurality of Dual In-line Memory Modules (DIMM). That is, the virtual memory controllers individually correspond to the DIMMs.

Figure 4:
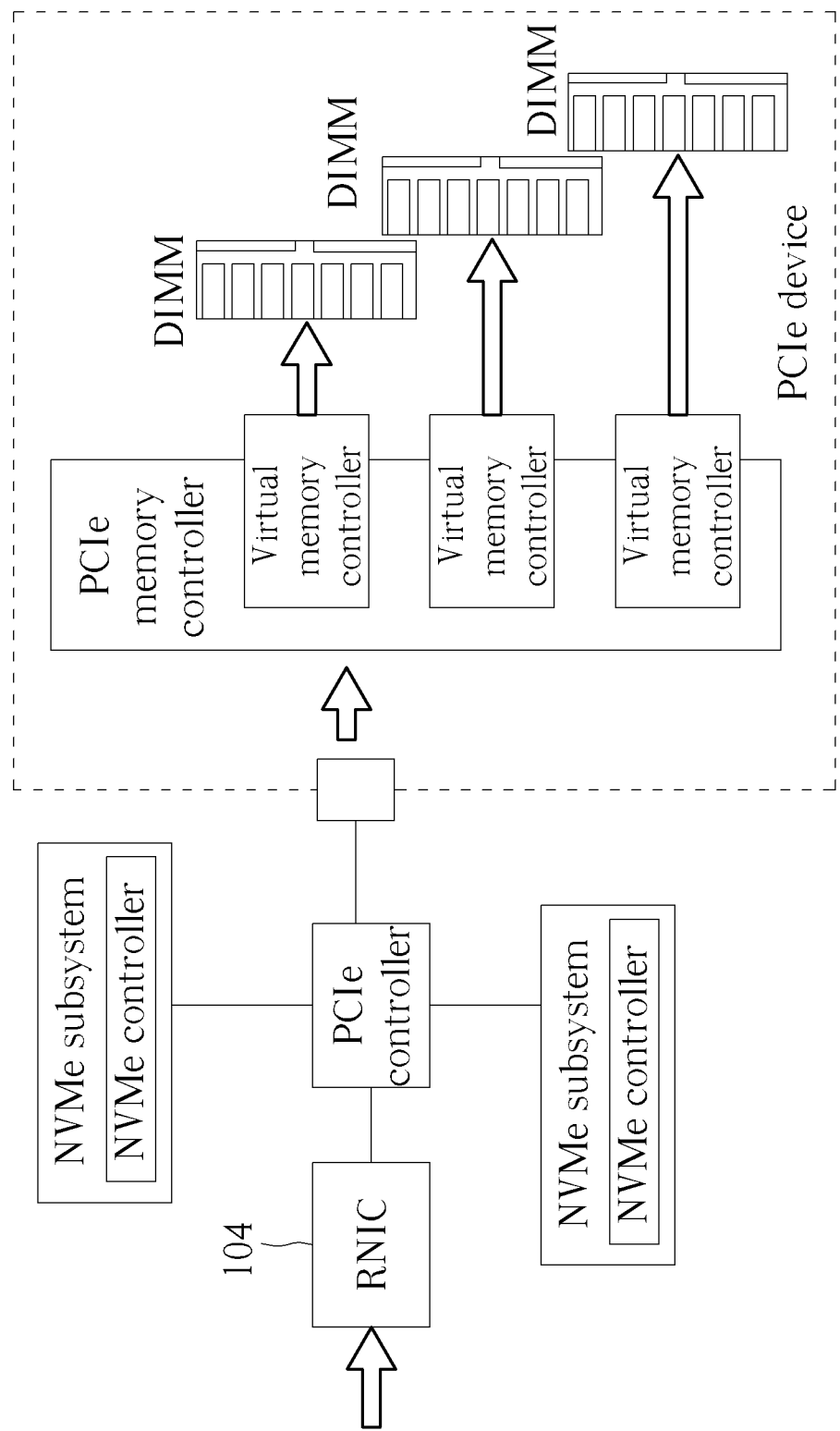

In another embodiment, please refer to FIG. 4, which is a schematic diagram of another implementation of FPGA according to an embodiment of the present invention. As shown in FIG. 4, the data are transmitted from the host terminal 102 (not depicted in FIG. 4) to the RNIC 104 of the JBOF 106 via the NVMe over Fabric. Meanwhile, the data enter a PCIe memory controller of a PCIe device virtualized by the FPGA via a PCIe controller. Then, a plurality of virtual memory controllers virtualized by the FPGA replicate or split the data into the data packets. The data packets are stored into the corresponding DRAM by a plurality of virtual memory controllers corresponding to the data packets, and the target terminal of the RNIC 104 provides the virtual memory addresses corresponding to the physical memory addresses to a plurality of NVMe subsystems. Notably, each of the virtual memory controllers of the PCIe memory controller corresponds to each of a plurality of DIMMs. That is, the virtual memory controllers individually correspond to the DIMMs.

Figure 5:
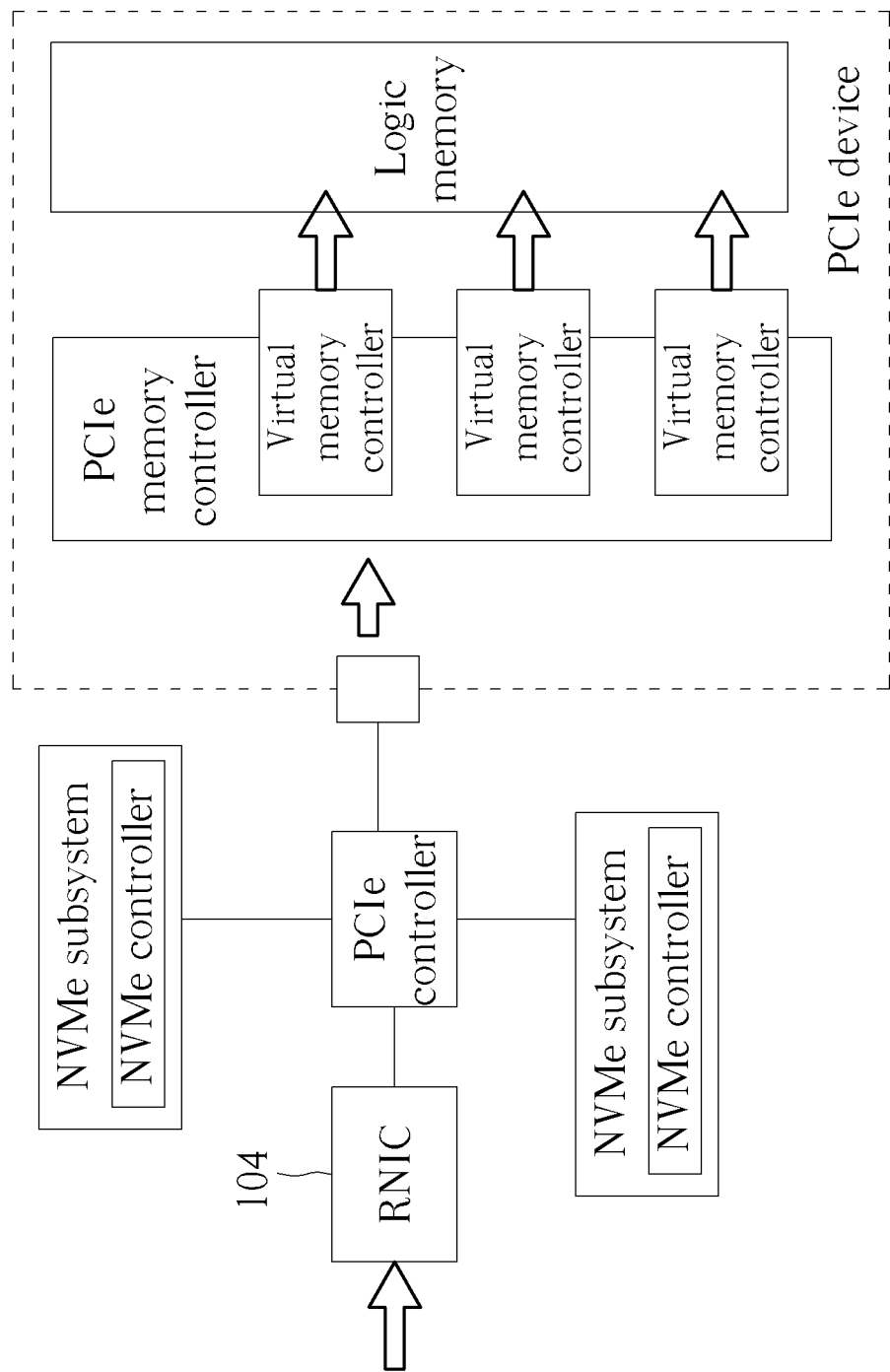

In another embodiment, please refer to FIG. 5, which is a schematic diagram of another implementation of FPGA according to an embodiment of the present invention. As shown in FIG. 5, the data are transmitted from the host terminal 102 (not depicted in FIG. 5) to the RNIC 104 of the JBOF 106 via the NVMe over Fabric. Meanwhile, the data enter a PCIe memory controller of a PCIe device virtualized by the FPGA via a PCIe controller. Then, the PCIe memory controller replicates or splits the data into the data packets, and a plurality of virtual memory controllers store the data packets into a logic memory, wherein the data packets stored in the logic memory have corresponding virtual memory addresses. Finally, the RNIC 104 of the target terminal provides the physical memory addresses corresponding to the addresses in the logic memory to a plurality of NVMe subsystems. In addition, the logic memory is virtualized by the FPGA, and the logic memory corresponds to a plurality of virtual memory controllers of the PCIe memory controller.

Therefore, as can be known from the abovementioned embodiments, the computer system 10 achieves virtualization of the redundant array of independent disks (RAID) of the NVME by the physical memory controller, the virtual memory controller, the DIMM, the PCIe memory controller and so on, which are virtualized by the FPGA, and provides the processing method of data redundancy under the structure of the NVMe over Fabric.

Figure 6:
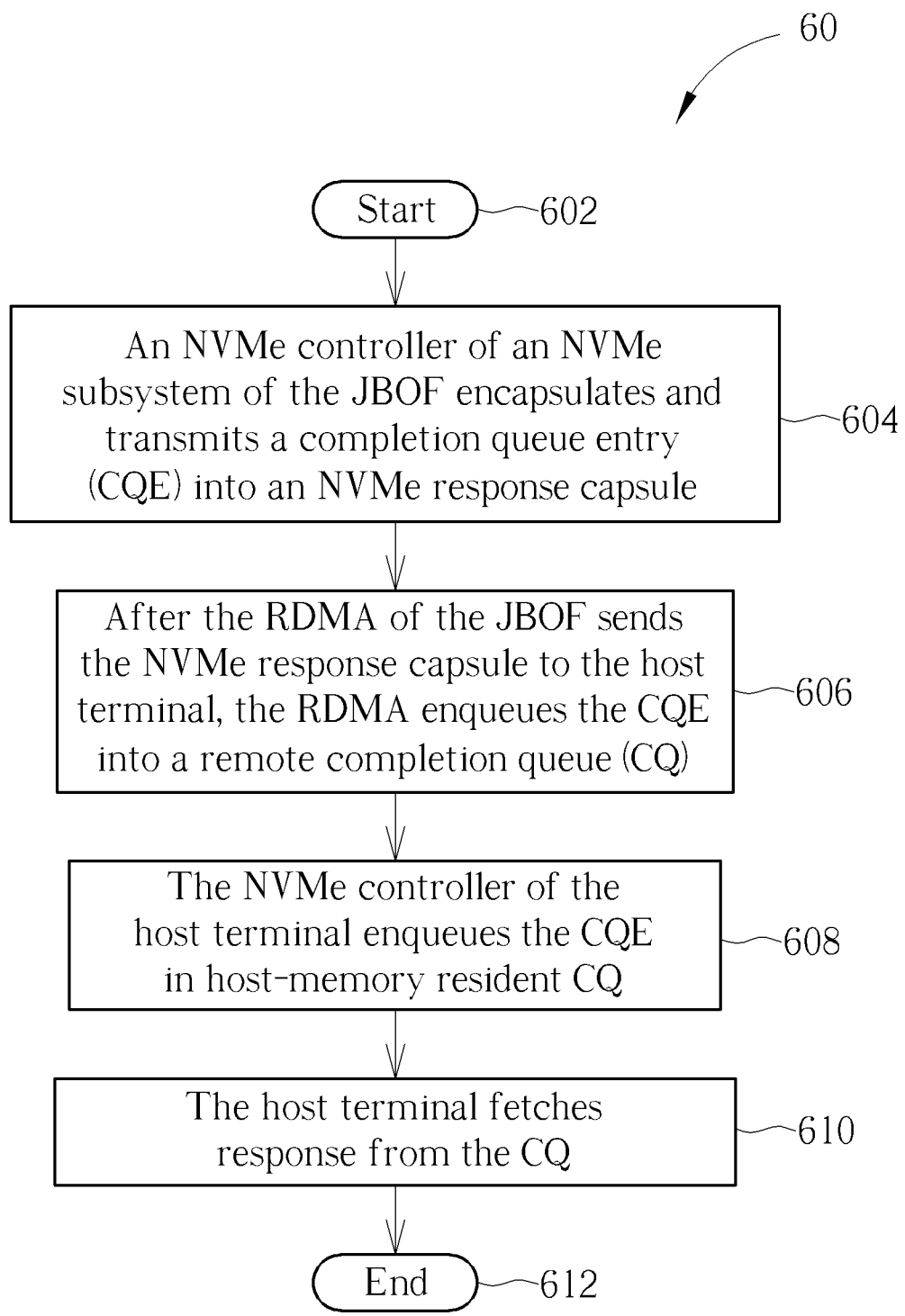
FIG. 6 is a schematic diagram of a response process of a JBOF according to an embodiment of the present invention.

When the computer system 10 finishes executing the write command of the host terminal 102, the JBOF 106 performs response to the write command of the processing process 20 of the data redundancy. Please refer to FIG. 6, which is a schematic diagram of a response process 60 of a JBOF according to an embodiment of the present invention. The response process 60 includes the following steps:

Steps 602: Start.

Steps 604: An NVMe controller of an NVMe subsystem of the JBOF 106 encapsulates and transmits a completion queue entry (CQE) into an NVMe response capsule.

Steps 606: After the RDMA of the JBOF 106 sends the NVMe response capsule to the host terminal 102, the RDMA enqueues the CQE into a remote completion queue (CQ).

Steps 608: The NVMe controller of the host terminal 102 enqueues the CQE in host-memory resident CQ.

Steps 610: The host terminal 102 fetches response from the CQ.

Steps 612: End.

Therefore, according to the response process 60, the JBOF 106 sends the response data of the finished write command back to the host terminal 102 in the point-to-point method.

In summary, the processing method of the data redundancy of NVMe of the present invention performs the point-to-point transportation of data over the fabric channel, so as to process the data redundancy and achieve transmission of low latency and high throughput. Notably, the embodiments stated above illustrate the concept of the present invention, those skilled in the art may make proper modifications accordingly, and not limited thereto. For example, the memory controller, the PCIe memory controller or the logic memory and so on virtualized by the FPGA may be modified based on structure or demand of the computer system, which belongs to the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing method of data redundancy, utilized for a Non-Volatile Memory express (NVMe) to transfer data via a fabric channel from a host terminal to a Remote-direct-memory-access-enable Network Interface Controller (RNIC) and a Just a Bunch of Flash (JBOF), the processing method comprising:
   virtualizing a Field Programmable Gate Array (FPGA) of the RNIC into a Dynamic Random Access Memory (DRAM) and storing the data to the DRAM;
   replicating or splitting the data into a plurality of data packets and reporting a plurality of virtual memory addresses corresponding to the plurality of data packets to the RNIC by the FPGA; and
   reading and transmitting the plurality of data packets to a plurality of corresponding NVMe controllers according to the plurality of virtual memory addresses;
   the FPGA correspondingly amending a plurality of data pointer values of a write command of a target terminal according to the plurality of virtual memory addresses;
   when the NVMe controller reads the plurality of data packets according to the plurality of virtual memory addresses, the FPGA performing an Erasure coding for the plurality of data packets and transmitting to the plurality of NVMe controllers; and
   when the plurality of data packets of the corresponding plurality of virtual memory addresses are read, deleting all the data in the DRAM;
   wherein the FPGA reports to the RNIC that a memory size of the FPGA is larger than that of the DRAM.

2. The processing method of claim 1, wherein the target terminal is utilized for pointing the plurality of the data pointer values of the write command, which is sent to the NVMe controller, to the corresponding plurality of virtual memory addresses, and transmitting the write command to a plurality of submission queues (SQ) of the corresponding NVMe controller.

3. The processing method of claim 1, further comprising:
   the RNIC processing the data based on one of a plurality of physical memory controllers; and
   replicating or splitting the data into the plurality of data packets after the FPGA receives the data, and storing the plurality of data packets to the DRAM by a plurality of virtual memory controllers corresponding to the plurality of physical memory controllers;
   wherein each of the plurality of physical memory controllers corresponds to one of a plurality of dual in-line memory modules (DIMM).

4. The processing method of claim 1, further comprising:
   the data entering a Peripheral Component Interconnect Express (PCIe) memory controller of a PCIe device, which is virtualized by the FPGA, via a PCIe controller; and
   the PCIe memory controller replicating or splitting the data into the plurality of data packets, and storing the plurality of data packets to the DRAM;
   wherein a plurality of virtual memory controllers of the PCIe memory controller individually corresponds to a plurality of dual in-line memory modules (DIMM).

5. The processing method of claim 1, further comprising:
   the data entering a PCIe memory controller of a PCIe device, which is virtualized by the FPGA, via a PCIe controller; and
   the PCIe memory controller replicating or splitting the data into the plurality of data packets, and the corresponding PCIe memory controller storing the plurality of data packets to a logic memory;
   wherein a plurality of virtual memory controllers of the PCIe memory controller correspond to the logic memory virtualized by the FPGA.

6. The processing method of claim 1, further comprising:
   a target terminal of the RNIC transmitting the plurality of virtual memory addresses to a plurality of NVMe subsystems.

7. A computer system, comprising:
   a host terminal, utilized for a Non-Volatile Memory express (NVMe) to transfer data via a fabric channel;
   a Remote-direct-memory-access-enable Network Interface Controller (RNIC), for receiving the data transmitted from the host terminal, virtualizing a Field Programmable Gate Array (FPGA) of the RNIC into a Dynamic Random Access Memory (DRAM) and storing the data to the DRAM, replicating or splitting the data into a plurality of data packets, and reporting a plurality of virtual memory addresses corresponding to the plurality of data packets to the RNIC by the FPGA; and
   a Just a Bunch of Flash (JBOF), for reading and transmitting the plurality of data packets to a plurality of corresponding NVMe controllers according to the plurality of virtual memory addresses
   wherein the FPGA of the RNIC correspondingly amends a plurality of data pointer values of a write command of a target terminal according to the plurality of virtual memory addresses; when the NVMe controller reads the plurality of data packets according to the plurality of virtual memory addresses, the FPGA performs an Erasure coding for the plurality of data packets and transmits to the plurality of NVMe controllers; and when the plurality of data packets of the corresponding plurality of virtual memory addresses are read, all the data in the DRAM are deleted.

8. The computer system of claim 7, wherein the target terminal is utilized for pointing the plurality of the data pointer values of the write command, which is sent to the NVMe controller, to the corresponding plurality of virtual memory addresses, and transmitting the write command to a plurality of submission queues (SQ) of the corresponding NVMe controller.

9. The computer system of claim 7, wherein the RNIC processes the data based on one of a plurality of physical memory controllers, wherein each of the plurality of physical memory controllers corresponds to one of a plurality of dual in-line memory modules (DIMM), the RNIC replicates or splits the data into the plurality of data packets after the FPGA receives the data, and stores the plurality of data packets to the DRAM by a plurality of virtual memory controllers corresponding to the plurality of physical memory controllers.

10. The computer system of claim 7, wherein the data of the RNIC enter a Peripheral Component Interconnect Express (PCIe) memory controller of a PCIe device, which is virtualized by the FPGA, via a PCIe controller, and the PCIe memory controller replicates or splits the data into the plurality of data packets, and stores the plurality of data packets to the DRAM, wherein a plurality of virtual memory controllers of the PCIe memory controller individually corresponds to a plurality of dual in-line memory modules (DIMM).

11. The computer system of claim 7, wherein the data of the RNIC enter a PCIe memory controller of a PCIe device, which is virtualized by the FPGA, via a PCIe controller, and the PCIe memory controller replicates or splits the data into the plurality of data packets, and the corresponding PCIe memory controller stores the plurality of data packets to a logic memory, wherein a plurality of virtual memory controllers of the PCIe memory controller correspond to the logic memory virtualized by the FPGA.

12. The computer system of claim 7, wherein a target terminal of the RNIC transmits the plurality of virtual memory addresses to a plurality of NVMe subsystems.

* * * * *